H. M. CONGER.
APPARATUS FOR MAKING SHEET MATERIAL.
APPLICATION FILED DEC. 27, 1913.
1,157,149.
Patented Oct. 19, 1915.
2 SHEETS—SHEET 1.
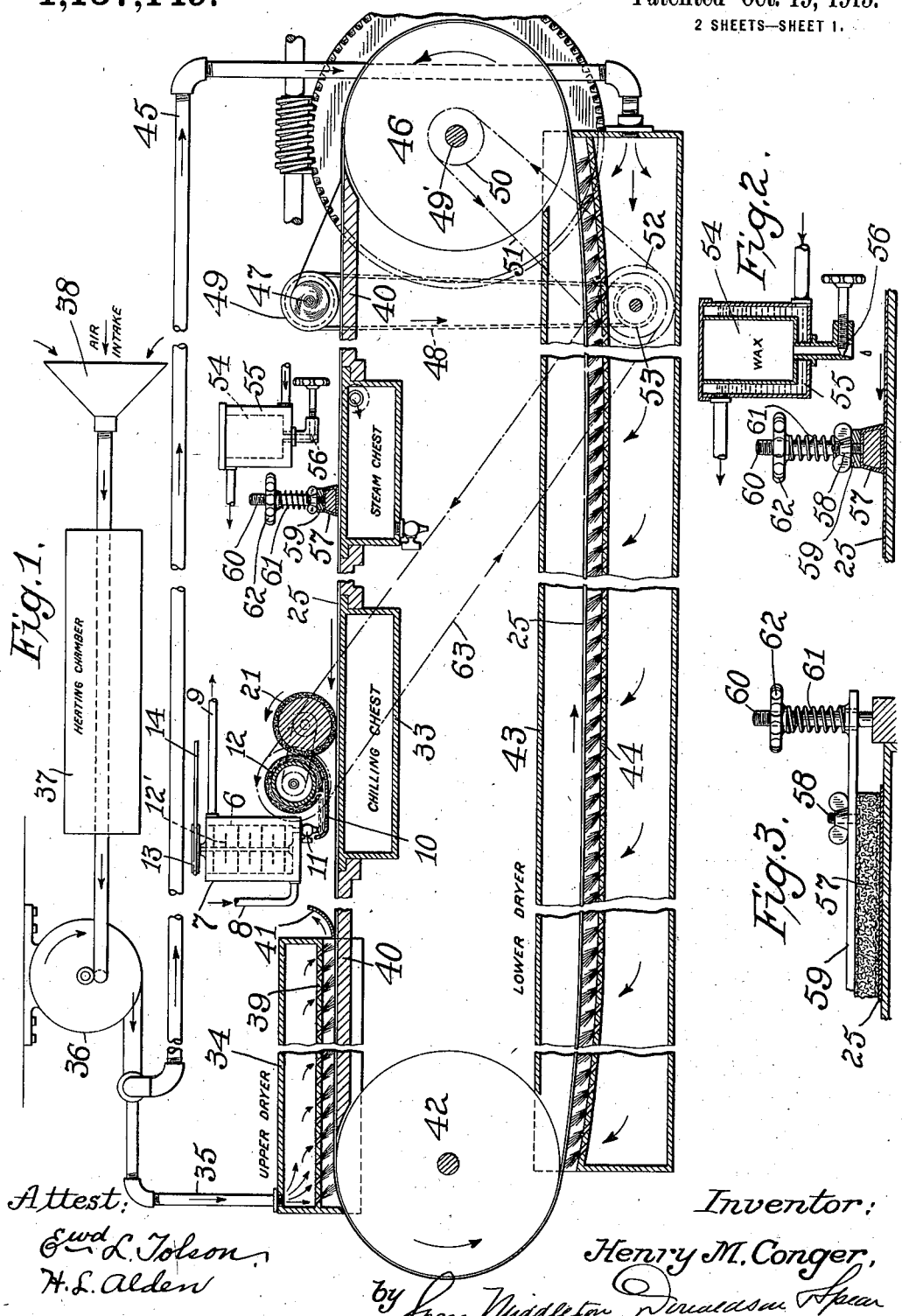
Attest:
Ewd L. Tolson
H. L. Alden
Inventor:
Henry M. Conger,
by Spear Middleton, Donaldson Spear
Attys.

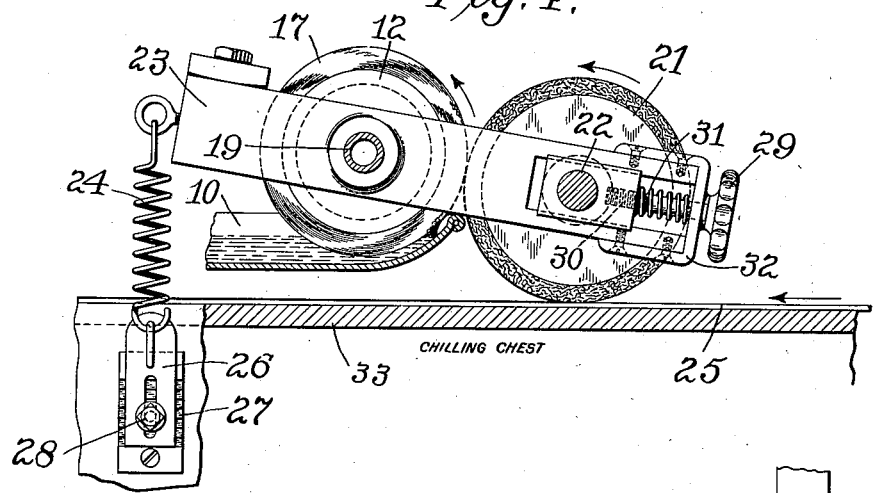
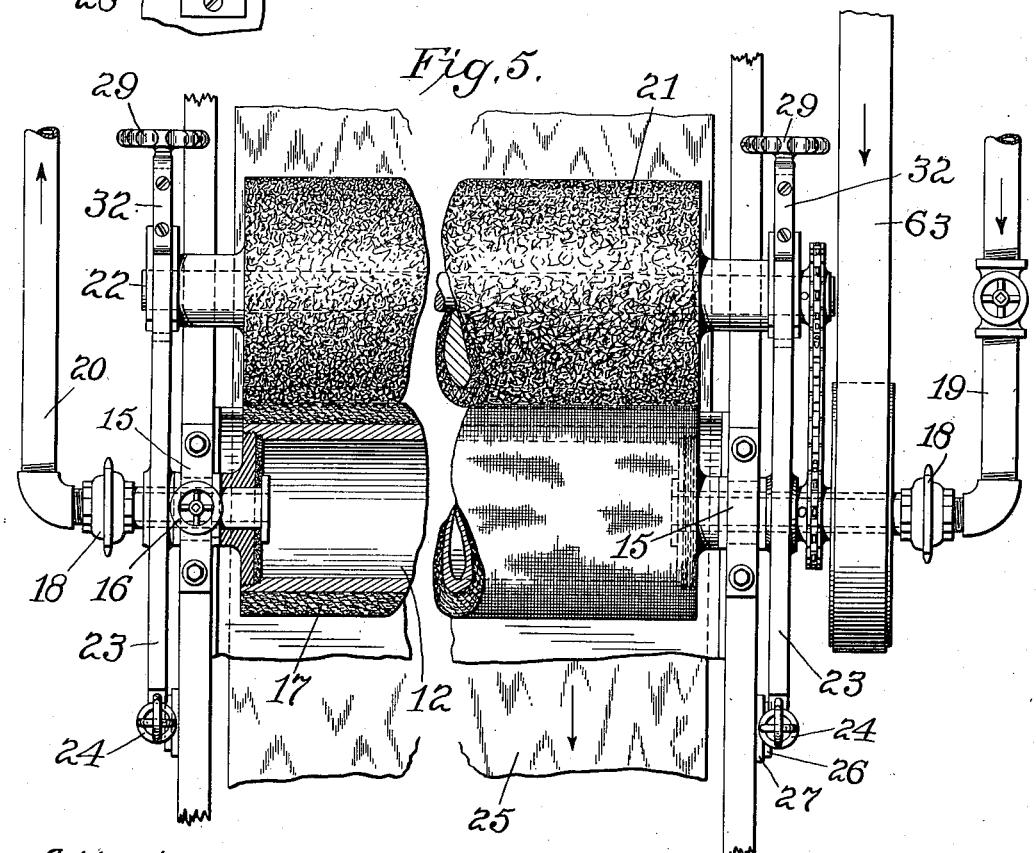

UNITED STATES PATENT OFFICE.

HENRY M. CONGER, OF WASHINGTON, DISTRICT OF COLUMBIA.

APPARATUS FOR MAKING SHEET MATERIAL.

1,157,149.         Specification of Letters Patent.        Patented Oct. 19, 1915.

Application filed December 27, 1913. Serial No. 809,082.

*To all whom it may concern:*

Be it known that I, HENRY M. CONGER, citizen of the United States, residing at Washington, District of Columbia, have invented certain new and useful Improvements in Apparatus for Making Sheet Material, of which the following is a specification.

My method and apparatus are designed particularly to produce the composition sheet or film described by me in another application for Letters Patent of the United States filed December 24, 1913, #808,587, said composition sheet being intended to be printed upon and used as a label having soluble qualities and adapted to the meat inspection service, but it will be understood that the invention may be used for producing sheets of material other than that composed of the ingredients mentioned in my said other application, and consisting, generally speaking, of gelatin, corn starch and glycerin in about the proportions of six ounces of the first, eight ounces of the second, and six to nine drams of the third ingredient, and nine pints of water.

One object of my present invention is to provide for the rapid and accurate production of the sheet film of uniform character as to thickness and quality, and to provide also for continuously rolling or packing the said sheet immediately after it has been produced, and subjected to the necessary steps or actions which render it in condition for use.

Another object of my invention is to produce the material in continuous sheet form, and the invention consists in the features of the method and of the machine, and in the combination and arrangement of parts hereinafter described and particularly set forth in the appended claims.

In the accompanying drawings Figure 1 is a view in the nature of a diagram, partly in side elevation and partly in section, and with parts broken away; Fig. 2 is a detail view of the wax applying devices, said parts being shown partly in section; Fig. 3 is a detail view of Fig. 2; Fig. 4 is a detail view of the feed and distributing rollers for the material showing their relation to the supply pan or tray, and the endless belt upon which the material is spread for its formation and setting into sheet form; Fig. 5 is a plan view of Fig. 4 with parts broken away and in section.

The composition or other material which is to be formed into the endless sheet is contained in a tank or reservoir 6 which is provided with a heating jacket 7 to which warm water is led by a pipe 8. 9 indicates the pipe for the outflow of the water from the water jacket. The material is delivered from this tank into a tray or pan 10 through suitable valves, one of which is indicated at 11, this being of a form to secure the proper delivery by allowing the material to drip through this valve into the pan 10. In this pan a feed roll 12 works, the pan being shallow, and holding only a small quantity of the material, the purpose being to feed it from the pan or tray soon after it is delivered thereto from the warm tank above described. It may be mentioned also that in the tank 6 the material is kept in proper fluid condition by agitating it, for which purpose beaters or agitating arms 12' are arranged upon a shaft driven through a pulley and belt 13, 14, from any suitable source of power. The feed roll 12 is mounted in bearings 15 of a suitable framework shown in Fig. 5, and one of these bearings is adjustable vertically by a hand wheel and screw indicated generally at 16. This feed roll is hollow, composed of a metal shell surrounded by textile fabric such, for instance, as cheese cloth indicated at 17. The journals of the roll are hollow, and are connected by unions or universal joints 18 with inlet and outlet pipes 19 and 20 by which warm water is passed through the feed roll to keep it warm for the purpose of maintaining the mixture or composition in the pan or tray 10 of proper fluidity. The feed roll delivers the material to a spreading roll 21 which may be formed of either a solid or a hollow center covered with any suitable spreading material, as wool felt. This roll is mounted in adjustable bearings 22 held in frame bars or arms 23, which are pivotally mounted on suitable bearings axially arranged in respect to the distributing roll 12. These arms are pressed by a spring 24, one for each arm, which springs counterbalance the weight of the spreading roller 21 to apply more or less pressure in the spreading or wiping action to thereby regulate the thickness of the film which is delivered to or spread upon the endless band 25. This band may be composed of any suitable material, but I have found zinc well suited to my purpose, and this band constitutes the surface or member upon which the setting or formation of the film is done.

The weight of the wiping or spreading roll 21 may be counterbalanced to a greater or less degree by adjusting the tension of the springs 24, for which purpose said springs are connected with a plate or bracket 26 having a serrated face engaging serrations of another plate 27 suitably secured to the frame, the two plates being held together by a bolt and slot connection 28. The bearings 22 may be adjusted by a finger wheel 29 and a screw 30, a spring 31 being interposed between the bearing 22 and the end 32 of the frame. The material is delivered or spread upon the endless zinc band in a thin film, the purpose being to make a sheet of, say, one or two thousandths of an inch in thickness. Immediately the material is delivered or wiped upon the endless zinc band, it is the purpose to chill it so that it will congeal and set in the exact form or in the exact place to which it is delivered to thereby prevent it running from place to place, leaving thin portions or holes at points throughout the width of the band, and for securing this congealing, setting or chilling effect I employ a chilling chest 33, Fig. 1, which is representative of any suitable means that may be provided for cooling the zinc band. The delivery and spreading rolls rotate in the direction of the arrows indicated in Fig. 1, and the band 25 is caused to move in the arrow direction so that the direction of movement of the spreading roll at its point of contact with the band is opposite to the direction of movement of said band so that an effective wiping or spreading action is secured. After the material has been spread on the band, the movement of said band carries the material to a drying chamber 34 which receives a blast of air through a pipe 35 from a blower or fan 36, which receives its supply through a heating chamber 37, the air intake being indicated at 38. This air, therefore, when it is delivered to the drying chamber, is warm, and from this drying chamber the warm air strikes the thin film of material carried by the band, and for so directing the air I provide the drying chamber with a perforated wall or partition 39, these perforations being inclined, as shown in Fig. 1. The sides of the air chamber project down alongside of the band, and this band rests upon and moves on a platform 40. The discharge of the warm air, after having performed its drying action on the film, takes place at the end of the drying chamber, as indicated by the arrow, and any suitable form of deflector 41 may be employed to direct the air upwardly and away from the band, this air being more or less moisture-laden. After being subjected to the drying action, the film is carried by the band about a roller 42 mounted in any suitable framework, and from this roller the band with the film set thereon moves through a lower drying chamber or box 43 which also has a perforated partition or wall 44 which directs blasts of warm air at an inclination to the surface of the belt, and to the film thereon, as indicated in Fig. 1. The partition 44 conforms to the sag of the lower stretch of the belt or band, and the delivery of warm air to this lower drying chamber takes place through a pipe 45 from the blower or fan 36 above mentioned. After leaving the lower drying chamber, the band, with its attached film, passes around a roller 46, and thence the band with the film is directed along the platform 40 for a short distance, the film being taken off or stripped from the zinc endless belt or band by a roller 47 mounted in any suitable bearings, which roller is rotated by an endless friction band 48 and pulley 49, the friction band being driven from any suitable source of power such, for instance, as the main shaft 49′ which has thereon a suitable pulley indicated diagrammatically at 50, which pulley, through an endless belt 51, drives a pulley 52, the shaft of which carries the lower pulley 53 about which the friction belt 48 passes. Of course in starting the process of stripping the film from the zinc plate or band, the end of the film must be raised from the zinc belt and attached to the roller 47, and then by rotating this roller at a speed conforming substantially to the surface movement of the endless belt, the film will be wound up on the roll and continuously stripped from the zinc belt. As the roll of film gets larger, the friction belt 48 will have a slipping action on its pulley, and automatic compensation will thus be afforded for the increase in size of the roll of material so that the speed of wind or of stripping will remain substantially uniform. The pull of the driving friction belt 48 is regulated to the tensile strength of the film so as to avoid breakage.

The endless band or belt of zinc, after leaving the point where the film is stripped therefrom and rolled, passes beneath a waxing appliance. This may assume various forms, but in the particular form shown it consists of a tank 54 in which the wax is maintained in liquid form by warm water or other heating medium introduced into a jacket 55 surrounding the tank. From this tank the wax is deposited in a small quantity, a few drops at a time, through a valve outlet or outlets 56 directly above the zinc band or carrier. In rear of this tank I provide a spreading device consisting of a pad 57 of suitable material held by wing nuts 58 to a bar 59 the ends of which are engaged by posts 60 having springs 61 thereon which press the bar, together with the distributing or spreading pad, downwardly upon the zinc belt or band, the tension of the springs being adjustable by the finger buttons 62. This waxing arrangement is to prevent the film from uniting with the zinc carrier band or belt so tightly as to interfere with its stripping or removal therefrom, after it has been dried and when it arrives at the stripping roller 47. In passing the wax applying devices, the band is heated and various devices may be used for this purpose, but in the particular construction shown I employ a steam chest. This keeps the band in proper condition to facilitate the spreading of the wax thereover. After leaving the wax applying devices, the band is exposed to the atmosphere, and as it has to traverse a considerable length of the platform 40 before it arrives at the spreading or distributing roller which applies the film or composition thereto, the wax has a chance to cool down, and this cooling action is augmented by the arrival of the waxed portion of the band to the chilling chest, and this happens before the portion of the band under discussion reaches the distributing roller for the composition, so that when the composition is delivered to and spread upon the waxed surface, this has been chilled and is in proper condition to cause the setting or congealing of the fluid substantially simultaneously with the action of delivering the composition on the band and distributing it. This completes the cycle of operation, and this cycle is repeated as long as the apparatus continues to run. Fig. 1 shows that the platform and other parts are broken away, this indicating that the apparatus is susceptible of being used in any length desired for getting the necessary effects in spreading, drying, stripping of the film, heating and waxing the band, and then cooling it. The apparatus may assume a length, say, of eighty feet, but this is susceptible of modification as may be desired. The apparatus, as above stated, is shown diagrammatically, and the various devices employed therein may be changed as to form, construction and operation to carry out the essential functions of the machine.

The feed roll is driven in any suitable way, as indicated by the belt 63. Only a small quantity of fluid is contained in the pan 10 in which the feed roll dips.

While I have referred to wax as the material for treating the band to prevent the sheet material from unduly adhering thereto, it is to be understood that the term "wax" is comprehensive in the sense that it is intended to include any material suitable for the purpose.

By my process the sheet of material needs no trimming because it sets in the position in which it is delivered, and its width and the lines of its edge are determined by the length of the spreading or wiping roll 21, which applies the mixture or composition to the zinc band.

I claim as my invention:—

1. In combination in apparatus of the class described for making film material, a moving carrier, means for delivering the material in warm fluid condition upon said carrier in a thin film, means for chilling said carrier to cause the liquid to congeal as soon as it contacts with the carrier, said material and carrier being non-adhesive relative to each other, means for drying the film on the carrier and means for stripping all the material from said carrier in the form of a film, substantially as described.

2. In combination in apparatus of the class described for making film material, a moving carrier, means for delivering the material in warm fluid condition upon said carrier, in a thin film, means for chilling said carrier to cause the liquid to congeal as soon as it contacts with the carrier, said material and carrier being non-adhesive relative to each other, means for drying the film on the carrier, means for stripping all the material from said carrier in the form of a film, and means for waxing the carrier before it reaches the point where the material is chilled on the carrier to secure the non-adhesive relation between the carrier and the material, substantially as described.

3. In combination in apparatus of the class described for making film material, a moving carrier, means for delivering the material in warm fluid condition upon said carrier in a thin film, means for chilling the carrier to cause the liquid to congeal as soon as it contacts with the carrier and thereby prevent spreading on the carrier, a roll for stripping the material from the carrier and storing the film upon itself, said roll being located at a sufficient distance apart from the delivering and chilling point to allow said film to dry, a compensating drive for said roll to prevent undue strain on the dry film as the stripped and stored film increases in diameter, means for warming and lubricating the carrier, said warming, lubricating and chilling means being located between the point where the film is stripped from the carrier and the point where the warm fluid is delivered onto the carrier, substantially as described.

In testimony whereof, I affix my signature in presence of two witnesses.

HENRY M. CONGER.

Witnesses:
ALICE L. BOORMAN,
A. MCCOY HANSON.